United States Patent [19]

Kainz

[11] Patent Number: 5,743,949
[45] Date of Patent: Apr. 28, 1998

[54] STABLE AQUEOUS WAX DISPERSIONS

[75] Inventor: Hans Jürgen Kainz, Neusäss, Germany

[73] Assignee: Hoechst Aktiengesellschaft, Frankfurt, Germany

[21] Appl. No.: 761,842

[22] Filed: Dec. 9, 1996

[30] Foreign Application Priority Data

Dec. 11, 1995 [DE] Germany ............... 195 46 073.1

[51] Int. Cl.⁶ .................................. C09D 191/06
[52] U.S. Cl. ................ 106/271; 106/131.1; 106/133.1; 106/190.1; 106/196.1; 106/200.3; 106/203.3; 106/216.1; 106/270; 106/272; 536/91; 536/95; 536/111
[58] Field of Search ............... 106/131.1, 133.1, 106/190.1, 196.1, 200.3, 203.3, 216.1, 270, 271, 272; 536/91, 95, 111

[56] References Cited

FOREIGN PATENT DOCUMENTS 4330342  3/1995  Germany .

OTHER PUBLICATIONS

Chemical Abstract No. 115:73492, which is an abstract of Japanese Patent Specification No. 3-108515 (May 1991).
Japio Abstract No. 404318074A, which is an abstract of Japanese Patent Specification No. 4-318074 (Apr. 1991).
WPIDS Abstract No. 94-124257, which is an abstract of Japanese Patent Specification No. 6-073371 (Mar. 1994).

*Römpp Chemielexikon* [*Römpp's Chemical Dictionary*], 9th Ed., pp. 2849-2851, 3559. No Date.

*Primary Examiner*—Anthony Green
*Attorney, Agent, or Firm*—Connolly and Hutz

[57] ABSTRACT

The present invention relates to stable aqueous wax dispersions comprising

A) 5 to 65% by weight of microized wax and

B) 0.01 to 7% by weight of polymeric carbohydrate derivatives as dispersing agent.

The waxes are amide, montan and polyethylene waxes, and particularly suitable carbohydrate derivatives are cellulose ethers. These wax dispersions are suitable for the preparation of care compositions for automobiles, shoes, floors and stone, drawing compounds, aqueous wood varnishes, printing inks and paints, for leather treatment, in papermaking and as release agents.

13 Claims, No Drawings

STABLE AQUEOUS WAX DISPERSIONS

Aqueous wax dispersions play an important role in the preparation of care compositions for automobiles, shoes, floors and stone, drawing compounds, water-based wood varnishes, cosmetic formulations and toothpastes, printing inks and paints, for leather treatment, in papermaking, in plastics processing and as release agents.

Aqueous amide, montan or polyolefin wax dispersions, also called wax emulsions, are prepared by known methods. Suitable surfactants (emulsifiers) are added to the wax, which is in the molten state, and the mixture is introduced into hot water, while stirring, the wax remaining dispersed under the action of the surfactant.

To achieve dispersion, the montan and polyolefin waxes are provided with hydrophilic groups, such as hydroxyl, keto or carboxylate groups. This functionalization can be achieved, for example, by atmospheric oxidation of polyolefin waxes or by chromic acid oxidation of montan waxes, with subsequent esterification with polyhydric alcohols.

The dispersing can also be carried out at elevated temperature under pressure if the melting point of the wax is above the boiling point of water. The dispersion is stabilized by cooling rapidly to significantly below the melting range of the wax. The resulting wax emulsion or dispersion as a rule has particle sizes in the range of 50 to 300 nanometers.

In addition to the known polyolefin and montan waxes (cf., for example, Römpp Chemielexikon [Römpp's Chemical Dictionary], 9th edition, page 2849 and page 3559), there are amide waxes of chemically different structure, for example bis-stearyl- or -palmitoyl-ethylenediamine, tradename, for example, Hoechst-Wachs C®, which as yet has not been emulsifiable by the method described above. Although a dispersion can be prepared by addition of a so-called "carrier wax", for example highly oxidized Fischer-Tropsch wax or a highly oxidized polyethylene wax, the industrial properties of the mixture are modified with respect to the pure Hoechst-Wachs C® to such an extent that use in certain areas is no longer possible. Amide waxes in the context of this invention are, for example, waxes of $C_{12}$ to $C_{18}$ fatty acids with ammonia, aliphatic or cycloaliphatic amines $R-NH_2$ having 12 to 20 carbon atoms, for example coconut- or stearylamide, or with linear or branched aliphatic or cycloaliphatic diamines having 2 to 12 carbon atoms, for example ethylenediamine, hexamethylenediamine, cyclohexyldiamine or TCD-diamine (tetracyclodecanediamine, $C_{12}H_{22}N_2$).

For certain fields of use, for example for water-based printing inks or water-based paints, dispersions of amide, montan or polyolefin waxes are required, it being possible for the wax substance to contain the abovementioned functional groups or else to be free from functional groups.

Solvent-based polyolefin wax dispersions are known and have been used for a relatively long time. They are prepared either by rapidly cooling the wax, as a solution in the hot organic solvent, or by dispersing the micronized polyolefin wax in the cold organic solvent, the particle size of the dispersed or micronized waxes being in the range from 1 to 50 micrometers.

DE-A43 30 342 describes aqueous polyolefin wax dispersions in which the wax has an acid number of less than 5 mg of KOH/g of wax and thus contains functional groupings. The high addition of up to 20% of a special surfactant required for dispersing the micronized wax can have an adverse effect on the use properties of the prepared finished product.

The use of solvent-containing dispersions which comprise micronized amide wax, the particle size of the wax particles being significantly more than 1 micrometer, has also been known for a relatively long time. These solvent-containing wax dispersions are used, inter alia, as matting agents in solvent-containing paints or as abrasion protection in solvent-containing printing inks.

The incorporation of the micronized wax into water-based paints and printing inks or similar water-based systems is difficult because of an inadequate wettability. Furthermore, the dust development associated with the incorporation is troublesome, dangerous and a health hazard. In the case of micronized polyolefin waxes which contain no functional groups, no wettability at all is found in pure water.

The object of the present invention was to provide stable aqueous amide, montan or polyolefin wax dispersions which are free from solvent. The dispersion should be based, inter alia, on non-functionalized polyolefin wax. The dispersing agent required should already have an action in a low concentration in order to exclude problems in the finished product. Furthermore, where appropriate, the dispersion should be approved for contact with foodstuffs in accordance with the recommendations of the Health Office.

Stable aqueous wax dispersions which comprise

A) 5 to 65% by weight of micronized wax and

B) 0.01 to 7% by weight of polymeric carbohydrate derivatives as dispersing agents have now been found.

By the choice of dispersing agent B, it is now possible to obtain stable aqueous amide, montan or polyolefin wax dispersions with the desired properties by simply stirring the corresponding micronized wax in water together with the dispersing agent at room temperature. Wax contents of up to 65% by weight can be achieved by this process. The waxes are micronized by customary processes, the average particle size being in the range from 1 to 50 μm. In the case of amide waxes, the range from 1 to 15 μm, in the case of montan waxes, the range from 1 to 40 μm, and in the case of polyethylene waxes, the range from 1 to 20 μm is particularly preferred.

The wax used is, for example, an amide wax, a synthetic product of stearic/palmitic acid and ethylenediamine, the acid component being present as a mixture of 50–60% by weight of a $C_{18}$-carbon chain and 50–40% by weight of a $C_{16}$-carbon chain. This wax has an acid number of 0 to 15, preferably 0 to 8 mg of KOH/g of wax and an alkali number of 0 to 3.5, preferably 0 to 2 mg of HCl, calculated as mg of KOH/g of wax.

It is also possible to use, for example, micronized montan wax, possible waxes being a) acid waxes b) ester waxes of montanic acid and monohydric or polyhydric alcohols (for example fatty alcohol, 1,2-ethanediol; 1,3-butanediol; 1,2-propanediol; glycerol, pentaerythritol, trimethylolpropane and ethoxylated analogs thereof, c) mixtures of esters and amides d) mixtures of the above ester waxes and alkali metal or alkaline earth metal, preferably Na or Ca, soaps of montanic acids and the micronized montan wax having an acid number of 0 to 40, preferably 0 to 20 mg of KOH/g of wax.

Waxes which can also readily be used are, for example, non-functionalized polyethylene waxes having an acid number of 0 and functionalized polyethylene waxes having an acid number of 0 to 19, preferably 0 to 10 mg of KOH/g of wax. The weight-average molecular weights are in the range from 500 to 10,000 g/mol, in particular 1,000 to 5,000 g/mol. The content of polyethylene in these waxes is advantageously more than 99% by weight.

The aqueous wax dispersions according to the invention comprise, as the main component, 5 to 65% by weight of micronized wax A and 0.01 to 7, preferably 0.03 to 5,% by weight of dispersing agent B. Aqueous wax dispersions with 20 to 55% by weight of amide or montan wax or with 20 to 62% by weight of polyethylene wax are particularly preferred. Any desired mixtures of the three types of waxes with one another are also possible.

Dispersing agent B is a water-soluble polymeric carbohydrate derivative, such as, for example, a cellulose derivative, a starch ether, such as, for example, methylstarch, or a bean flour derivative, such as guar or carob bean flour. The term carbohydrate derivative in the context of this invention also includes other biopolymers, such as pectin, gum arabic or other polysaccharides. Water-soluble cellulose derivatives are particularly suitable dispersing agents. Water-soluble in the context of the invention means that 0.01 to 7% by weight of the dispersing agent can be incorporated into the aqueous wax dispersion.

The cellulose derivatives used as dispersing agents are, for example, water-soluble cellulose ethers of the alkylated and/or hydroxyalkylated, nonionic alkylcellulose type, abbreviations AC and AHAC. Suitable examples are, inter alia, hydroxyethylcellulose (HEC), methylcellulose (MEC), methylhydroxyethylcellulose (MHEC), carboxymethylcellulose (CMC) or alkali metal celluloses, in particular sodium carboxymethylcellulose (NACMC). Cellulose ethers of the alkylhydroxyalkylcellulose type, the alkyl chain of which consists of 1 to 3 carbon atoms, and hydroxyethylcellulose and sodium carboxymethylcellulose are particularly preferred.

The dispersing agents have various viscosity levels and various degrees of etherification. The viscosity of the aqueous solutions of the carbohydrate derivatives is closely related to the degree of polymerization. The degree of polymerization is defined by the number of basic structural units in the macromolecule. The higher the degree of polymerization, the higher the molecular weight and therefore the thickening action of the carbohydrate derivatives in aqueous solution.

The viscosity of the cellulose derivatives is determined on a 2% strength by weight aqueous solution in a Hoppler falling-ball viscometer at +20° C. The viscosities of the commercial water-soluble cellulose derivatives used here are, depending on degree of polymerization, in 2% strength by weight aqueous solution between 2 and 200,000 mPas (measured by the method of Höpppler). A methylhydroxyethylcellulose of viscosity level 50 mPas is referred to in the present application as "MHEC 50".

The etherification has the effect of converting the insoluble cellulose into a water-soluble derivative. The number of etherified hydroxyl groups of an anhydroglucose unit is called the degree of etherification or average degree of substitution (DS).

The cellulose derivatives described for dispersing the wax have, for example, a degree of etherification of 0.1 to 5, preferably 0.1 to 3.

The various types of cellulose derivatives described above can be used individually or in any desired combination for dispersing the wax. Mixtures of alkylhydroxyalkylcellulose with other cellulose ethers are particularly preferred.

In addition to dispersing agent B, polyacrylic acids having a molecular weight of about 2,000 to 20,000 or polyphosphates of average chain length, water-dispersible lecithin, water-dispersible nonionic surfactants of various levels of ethoxylation, for example polysorbate, such as POE (20) sorbitan monooleate, monostearate, monopalmitate, monolaurate, tristearate or trioleate, fatty alcohol polyglycol ethers based on tallow fatty or isotridecyl alcohol, coconut fatty, oleyl or stearyl alcohol or oxo alcohol and nonylphenol polyglycol ether, and furthermore so-called anionic surfactants, such as Na alkanesulfonate, Na olefinsulfonate, Na lauryl alcohol ether sulfate, Na oleic acid methyltauride, Na oleic acid isothionate, Na oleic acid sarcoside or Na alkylphenol ether sulfate, can be added to the aqueous solution.

The aqueous polyolefin wax dispersions according to the invention are particularly suitable for the preparation of care compositions for automobiles, shoes, floors and stone, drawing compounds, aqueous wood varnishes, printing inks and paints, for leather treatment, in papermaking and as release agents.

The following examples serve to illustrate the invention and are not to be understood as limiting. The viscosities of the wax dispersions according to Examples 1 to 5 were determined with a Haake rotary viscometer R 20 at room temperature. All the percentage data are to be understood as % by weight.

EXAMPLE 1

112.6 g of a 2.5% strength aqueous cellulose ether solution of the MHEC 50 type (Tylose® MH 50, manufacturer Hoechst) are initially introduced into the dispersing vessel. 87.2 g of micronized polyethylene wax of acid number 0 (Ceridust® 3620, manufacturer Hoechst) are sprinkled in and dispersed, while stirring intensively. The dispersion is homogeneous, pourable and storage-stable and has a viscosity of 2,400 mPas.

EXAMPLE 2

111.4 g of a 1.5% strength aqueous cellulose ether solution of the MHEC 300 type (Tylopur® MH 300, manufacturer Hoechst) are initially introduced into the dispersing vessel. 88.6 g of micronized polyethylene wax of acid number 0 (Ceridust® 3620, manufacturer Hoechst) are sprinkled in and dispersed, with intensive stirring. The dispersion is homogeneous, pourable and storage-stable and has a viscosity of 1,400 mPas.

EXAMPLE 3

1.68 g of cellulose ether of the MHEC 300 type (Tylopur® MH 300, manufacturer Hoechst) and 0.56 g of water-dispersible lecithin (Lipotin® NE, manufacturer Lucas Meyer, Hamburg) are dissolved in 109.76 g of water at room temperature. 87.8 g of micronized polyethylene wax of acid number 0 (Ceridust® 3620, manufacturer Hoechst) are sprinkled into this solution and dispersed, with intensive stirring. The dispersion is homogeneous, pourable and storage-stable and has a viscosity of 1,400 mPas.

EXAMPLE 4

1.68 g of cellulose ether of the MHEC 300 type (Tylopur® MH 300, manufacturer Hoechst) and 0.56 g of POE (20) sorbitan monooleate (Radiasurf® 7157, manufacturer Fina Chemicals, Brussels) are dissolved in 109.76 g of water at room temperature. 87.8 g of micronized polyethylene wax of acid number <10 (Ceridust® 3715, manufacturer Hoechst) are sprinkled into this solution and dispersed, with intensive stirring. The dispersion is homogeneous, pourable and storage-stable and has a viscosity of 2,100 mPas.

EXAMPLE 5

1.68 g of cellulose ether of the MHEC 300 type (Tylopur® MH 300, manufacturer Hoechst) and 0.56 g of water-dispersible lecithin (Lipotin® NE, manufacturer Lucas Meyer, Hamburg) are dissolved in 109.76 g of water at room temperature. 87.8 g of micronized polyethylene wax of acid number <10 (Ceridust® 3715, manufacturer Hoechst) are sprinkled into this solution and dispersed, with intensive stirring. The dispersion is homogeneous, pourable and storage-stable and has a viscosity of 1,900 mPas.

EXAMPLE 6

81.2 g of a 1.5% strength aqueous cellulose ether solution of the MHEC 50 type (Tylose® MH 50, manufacturer Hoechst) are initially introduced into the dispersing vessel. 118.8 g of polyethylene wax of acid number <5 mg of KOH/g of wax (Luwax® AF 30, manufacturer BASF) are sprinkled in and dispersed, with intensive stirring. The dispersion is homogeneous, pourable and storage-stable.

EXAMPLE 7

111.7 g of an aqueous solution comprising 0.84 g of cellulose ether of the MHEC type (Tylopur® MH 300, manufacturer Hoechst) and 0.84 g of cellulose ether NaCMC (Tylopur® C 600, manufacturer Hoechst) are initially introduced into the dispersing vessel. 88.3 g of micronized polyethylene wax of acid number 0 (Ceridust®) 3620, manufacturer Hoechst) are sprinkled into this solution and dispersed, with intensive stirring. The dispersion is homogeneous, pourable and storage-stable.

EXAMPLE 8

111.7 g of an aqueous solution comprising 0.84 g of cellulose ether of the MHEC type (Tylopur® MH 300, manufacturer Hoechst) and 0.84 g of cellulose ether HEC (Tylopur® H 300, manufacturer Hoechst) are initially introduced into the dispersing vessel. 88.3 g of micronized polyethylene wax of acid number 0 (Ceridust® 3620, manufacturer Hoechst) are sprinkled into this solution and dispersed, with intensive stirring. The dispersion is homogeneous, pourable and storage-stable.

EXAMPLE 9

112.0 g of an aqueous solution comprising 1.12 g of cellulose ether of the MHEC type (Tylopur® MH 300, manufacturer Hoechst) and 0.84 g of hydroxypropylstarch (Amitrolit® P 1 HV, manufacturer Agrana, 3950 Gmünd, Austria) are initially introduced into the dispersing vessel. 88.0 g of micronized polyethylene wax of acid number 0 (Ceridust® 3620, manufacturer Hoechst) are sprinkled into this solution and dispersed, with intensive stirring. The dispersion is homogeneous, pourable and storage-stable.

EXAMPLE 10

112.0 g of an aqueous solution comprising 1.12 g of cellulose ether of the MHEC type (Tylopur® MH 300, manufacturer Hoechst) and 0.84 g of hydroxypropylstarch (Amitrolit® P 1 HV, manufacturer Agrana, 3950 Gmünd, Austria) are initially introduced into the dispersing vessel. 88.0 g of micronized polyethylene wax of acid number <10 (Ceridust® 3715, manufacturer Hoechst) are sprinkled into this solution and dispersed, with intensive stirring. The dispersion is homogeneous, pourable and storage-stable.

EXAMPLE 11

112.6 g of an aqueous solution comprising 1.683 g of cellulose ether MHEC (=Tylopur® MH 1000 P, manufacturer Hoechst) and 0.563 g of sorbitan monooleate 20 EO (=Radiasurf® 7157, manufacturer Fina, Brussels) are initially introduced into the dispersing vessel. 87.2 g of micronized amide wax (Ceridust 3910®, manufacturer Hoechst) are metered in, with intensive stirring. The dispersion is homogeneous, pourable and storage-stable. The viscosity is 2700 mPas.

EXAMPLE 12

113.2 g of an aqueous solution comprising 1.698 g of cellulose ether MHEC (=Tylopur® MH 300, manufacturer Hoechst) and 1.698 g of sorbitan monooleate 20 EO (=Radiasurf®) 7157, manufacturer Fina, Brussels) are initially introduced into the dispersing vessel. 86.6 g of micronized amide wax (Ceridust® 3910, manufacturer Hoechst) are metered in, with intensive stirring. The dispersion is homogeneous, pourable and storage-stable. Viscosity of the dispersion: 2400 mPas.

EXAMPLE 13

113.8 g of an aqueous solution comprising 2.276 g of cellulose ether MHEC (=Tylose® MH 50, manufacturer Hoechst) and 1.707 g of sorbitan monooleate 20 EO (=Radiasurf® 7157, manufacturer Fina, Brussels) are initially introduced into the dispersing vessel. 86.0 g of micronized amide wax (Ceridust® 3910, manufacturer Hoechst) are metered in with intensive stirring. The dispersion is homogeneous, pourable and storage-stable. Viscosity of the dispersion: 2000 mPas.

EXAMPLE 14

106 g of a 1% strength aqueous cellulose ether solution MHEC 50 (Tylose® MH 50, manufacturer Hoechst) are initially introduced into the dispersing vessel. 94.0 g of micronized amide wax (Mikropulver® PM, manufacturer Hoechst) are metered in, with intensive stirring. The dispersion is homogeneous, pourable and storage-stable.

EXAMPLE 15

106 g of a 1% strength aqueous cellulose ether solution MHEC 30 (Tylose® MH 300, manufacturer Hoechst) are initially introduced into the dispersing vessel. 94.0 g of micronized amide wax (Mikropulver® PM, manufacturer Hoechst) are metered in, with intensive stirring. The dispersion is homogeneous, pourable and storage-stable.

EXAMPLE 16

97.9 g of an aqueous solution comprising 1.46 g of cellulose ether MHEC (=Tylose® MH 300, manufacturer Hoechst) and 1.46 g of sorbitan monooleate 20 EO (=Radiasurf® 7157, manufacturer Fina, Brussels) are initially introduced into the dispersing vessel. 102.1 g of micronized amide wax (Ceridust® 3910, manufacturer Hoechst) are metered in, with intensive stirring.

EXAMPLE 17

111.7 g of an aqueous solution comprising 0.84 g of cellulose ether MHEC (=Tylopur® MH 300, manufacturer Hoechst) and 0.84 g of cellulose ether NaCMC (=Tylopur® C 600, manufacturer Hoechst) are initially introduced into the dispersing vessel. 88.3 g of micronized amide wax (Ceridust®) 3910, manufacturer Hoechst) are metered in, with intensive stirring. The dispersion is homogeneous, pourable and storage-stable.

EXAMPLE 18

111.7 g of an aqueous solution comprising 0.84 g of cellulose ether MHEC (=Tylopur® MH 300, manufacturer Hoechst) and 0.84 g of cellulose ether HEC (=Tylose® H 300, manufacturer Hoechst) are initially introduced into the dispersing vessel. 88.3 g of micronized amide wax (Ceridust® 3910, manufacturer Hoechst) are metered in, with intensive stirring. The dispersion is homogeneous, pourable and storage-stable.

EXAMPLE 19

112.0 g of an aqueous solution comprising 1.12 g of cellulose ether of the MHEC type (=Tylopur® MH 300, manufacturer Hoechst) and 0.84 g of hydroxypropylstarch (=Amitrolit® P 1 HV, manufacturer Agrana, 3950 Gmünd, Austria) are initially introduced into the dispersing vessel. 88.0 g of micronized amide wax (Ceridust® 3910, manufacturer Hoechst) are metered into this solution, with intensive stirring. The dispersion is homogeneous, pourable and storage-stable.

EXAMPLE 20

111.2 g of a 1% strength aqueous cellulose ether solution of the MHEC type (=Tylopur® MH 300, manufacturer Hoechst) are initially introduced into the dispersing vessel. 88.8 g of micronized montan wax (Ceridust® 5551, manufacturer Hoechst) are sprinkled in and dispersed, with intensive stirring. The dispersion is homogeneous, pourable and storage-stable and has a viscosity of 670 mPas.

EXAMPLE 21

111.6 g of a 1.5% strength aqueous cellulose ether solution of the MHEC type (=Tylopur® MH 300, manufacturer Hoechst) are initially introduced into the dispersing vessel. 88.3 g of micronized montan wax (Ceridust® 5551, manufacturer Hoechst) are sprinkled in and dispersed, with intensive stirring. The dispersion is homogeneous, pourable and storage-stable and has a viscosity of 1900 mPas.

EXAMPLE 22

111.7 g of an aqueous solution comprising 0.84 g of cellulose ether MHEC (=Tylopur® MH 300, manufacturer Hoechst) and 0.84 g of cellulose ether NaCMC (=Tylopur® C 30, manufacturer Hoechst) are initially introduced into the dispersing vessel. 88.3 g of micronized montan wax (Ceridust®) 5551, manufacturer Hoechst) are metered in, with intensive stirring. The dispersion is homogeneous, pourable and storage-stable.

EXAMPLE 23

111.7 g of an aqueous solution comprising 0.84 g of cellulose ether MHEC (=Tylopur®) MH 300, manufacturer Hoechst) and 0.84 g of cellulose ether HEC (=Tylose® H 300, manufacturer Hoechst) are initially introduced into the dispersing vessel. 88.3 g of micronized montan wax (Ceridust® 5551, manufacturer Hoechst) are metered in, with intensive stirring. The dispersion is homogeneous, pourable and storage-stable.

EXAMPLE 24

112.0 g of an aqueous solution comprising 1.12 g of cellulose ether of the MHEC type (=Tylopur® MH 300, manufacturer Hoechst) and 0.84 g of hydroxypropylstarch (Amitrolit® P 1 HV, manufacturer Agrana, 3950 Gmünd, Austria) are initially introduced into the dispersing vessel. 88.0 g of micronized montan wax (Ceridust® 5551, manufacturer Hoechst) are sprinkled into this solution and dispersed, with intensive stirring. The dispersion is homogeneous, pourable and storage-stable.

I claim:

1. A stable aqueous wax dispersion comprising
   A) 5 to 65% by weight of micronized wax, the wax comprising an amide or montan or polyethylene wax or a mixture thereof,
   B) 0.01 to 7 by weight of polymeric carbohydrate derivatives as a dispersing agent, the polymeric carbohydrate derivatives comprising a cellulose ether or starch ether or bean flour derivative or a mixture thereof, and
   C) 94.99 to 28% water, and wherein the wax has an average particle size of 1 to 50 μm.

2. A stable aqueous wax dispersion as claimed in claim 1, wherein the amide wax has an average particle size of 1 to 15 μm.

3. A stable aqueous wax dispersion as claimed in claim 1, wherein the amide wax has an acid number of 0 to 15.

4. A stable aqueous wax dispersion as claimed in claim 1, wherein the amide wax has an alkali number of 0 to 3.5.

5. A stable aqueous wax dispersion as claimed in claim 1, wherein the montan wax has an average particle size of 1 to 40 μm.

6. A stable aqueous wax dispersion as claimed in claim 1, wherein the montan wax has an acid number of 0 to 40.

7. A stable aqueous wax dispersion as claimed in claim 1, wherein the polyethylene wax has an average particle size of 1 to 20 μm.

8. A stable aqueous wax dispersion as claimed in claim 1, wherein the wax is a functionalized polyethylene wax with an acid number of 1 to 19.

9. A stable aqueous wax dispersion as claimed in claim 1, wherein the wax is a non-functionalized polyethylene wax with an acid number of 0.

10. A stable aqueous wax dispersion as claimed in claim 1, which comprises 20 to 55% by weight of amide or montan wax.

11. A stable aqueous wax dispersion as claimed in claim 1, which comprises 20 to 62% by weight of polyethylene wax.

12. A stable aqueous wax dispersion as claimed in claim 1, wherein the cellulose ether is an alkylhydroxyalkylcellulose or a mixture thereof with other cellulose ethers.

13. A stable aqueous wax dispersion as claimed in claim 1, wherein the cellulose ether has a degree of etherification of 0.1 to 5 and a viscosity level of 2 to 200,000 mPas.

* * * * *